July 2, 1940.   O. ZIMMERMANN   2,206,382
PHOTOGRAPHIC VIEW FINDER
Filed Dec. 13, 1938
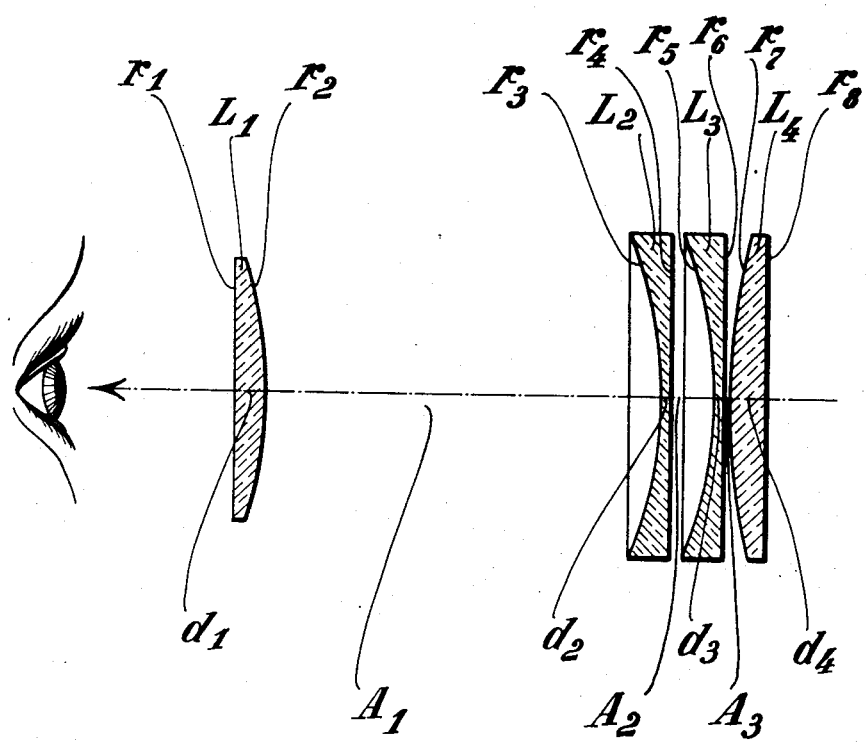
INVENTOR
Otto Zimmermann
BY
ATTORNEY

UNITED STATES PATENT OFFICE 2,206,382

PHOTOGRAPHIC VIEW FINDER

Otto Zimmermann, Wetzlar, Germany, assignor to Ernst Leitz, G. m. b. H., Wetzlar, Germany Application December 13, 1938, Serial No. 245,353
In Germany December 30, 1937

3 Claims. (Cl. 88—1.5)

Direct-view photographic view finders which, according to the principle of an inverted Galileo telescope, include a positive element facing the eye and a negative element facing the object, the negative element consisting of one or two negative mostly planeconcave lenses, are subject to distortion of the image as soon as the angle of view becomes relatively large. In such case the finder will show a somewhat greater portion of the field of view than that which is to be photographed. The distortion is said to be barrel-formed. This distortion cannot be eliminated in finders of such known prior construction.

The object of this invention is to eliminate the distortion by adding a positive element to the negative element of the finder. Very favorable conditions result when the additional positive element is placed farthest from the eye and is formed with unlike curved surfaces, the strongest curved surface of which faces the eye. Said strongest curved surface of said positive lens has such a great positive refractive power, that it amounts at least to 1/20 of the refractive power of the whole positive lens. The other side which faces the object may be plane, convex or concave.

The accompanying drawing illustrates the lens system in a direct-view photographic finder according to this invention. This finder gives a two-fold reduction of the image. The data for the lenses are as follows:

| Radius | Distance | Thickness | Index of refraction |
|---|---|---|---|
| r1=∞ | A1=26.5 | d1=1.8 | 1.516 |
| r2=−31.0 | A2=3.0 | d2=0.7 | 1.516 |
| r3=−27.0 | A3=0.2 | d3=0.7 | 1.516 |
| r4=∞ | | d4=2.5 | 1.516 |
| r5=−27.0 | | | |
| r6=∞ | | | |
| r7=+65.0 | | | |
| r8=∞ | | | |

The above lens arrangement which is free from distortion may be easily used in finders of the type disclosed in U. S. Patent 2,093,299 in which the field of view is seen within a frame which is reflected in infinity in a mirrored frame facing the eye. With such a combination it is advisable to bend the frame member to avoid the distortion which occurs by the forming of the image through the eye lens and the mirror so that in such a finder both the field of view as well as the frame member for framing the field of view are seen without distortion. Such suggested use is mentioned only by way of example and not as a limitation.

I claim:

1. A direct-view photographic view finder according to the principle of an inverted Galilean telescope in which the negative element consists of at least two negative lenses the strongest curved surfaces of which face the eye, characterized by that the said negative element includes an additional positive lens having unlike curved surfaces, with the strongest curved surface facing the eye in front of said two negative lenses, whereby to eliminate barrel-formed distortion in said view finder.

2. A view finder according to claim 1 characterized by that the surface of the positive lens which faces the eye has such a great positive refractive power, that it amounts to at least 1/20 of the refractive power of the whole positive lens.

3. A view finder according to claim 1 characterized by that the additional positive lens is the last element in the finder counting from the eye position.

OTTO ZIMMERMANN.